June 16, 1931.  G. TRUPIANO  1,810,543
PROTECTIVE STRAINER AND COOKING POT
Filed Oct. 4, 1930
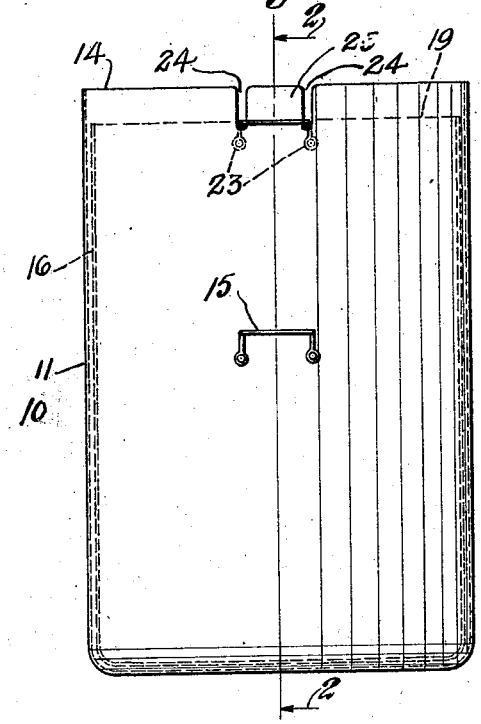
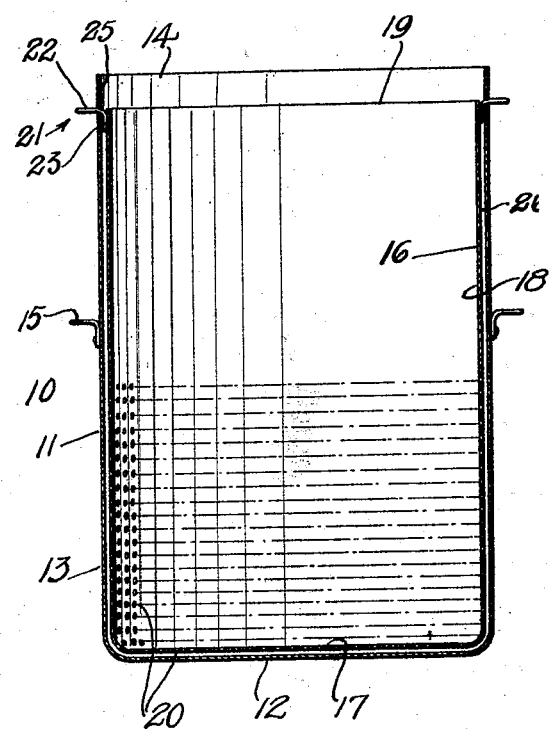
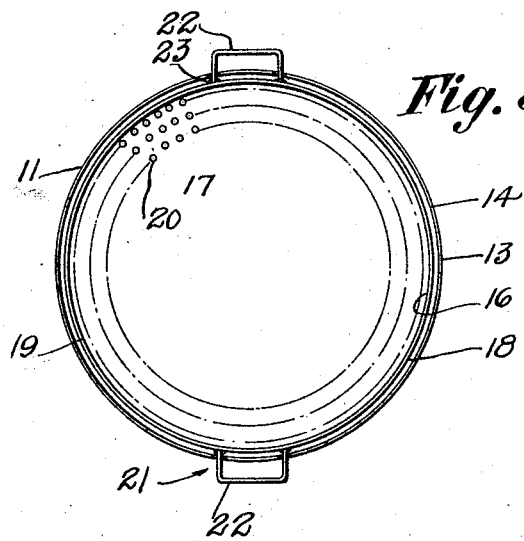

Patented June 16, 1931

1,810,543

UNITED STATES PATENT OFFICE

GEROME TRUPIANO, OF BROOKLYN, NEW YORK

PROTECTIVE STRAINER AND COOKING POT

Application filed October 4, 1930. Serial No. 486,325.

This invention relates to household appliances and has particular reference to cooking utensils.

One object of this invention is to provide an improved combination strainer and cooking pot wherein the strainer contains a product being cooked in water, so that upon removal of the strainer from the pot, the liquid is coincidentally drained.

Another object is to provide a strainer only the lower portion of which is perforated and the wall of which is in improved close relation to the wall of a cooking pot for efficient heating action and conservation of heat.

Another object of the invention is the provision of an improved combination strainer and cooking pot wherein the strainer is substantially as large as the pot and has walls in close proximity to the walls of the pot providing a double wall effect preventing the cooked contents from becoming burned, and assuring full circulation of the cooking liquid through said contents.

Another object of the invention is to furnish a device of the character described having improved means for supporting the strainer in the pot and for permitting convenient removal of the strainer therefrom; also to constitute a spacing means between the walls of the strainer and the pot.

A further object of the invention is to furnish a device of the type mentioned having few and simple parts, and which is inexpensive to manufacture, and rugged, reliable, and efficient in use and in heating.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view in side elevation of a combination strainer and pot embodying the invention.

Fig. 2 is a vertical sectional view thereof taken on line 2—2 of Fig. 1.

Fig. 3 is a top plan view of the device.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

This invention is intended particularly for cooking macaroni, and spaghetti, but it may be used for cooking, and heat treating any other foods or materials not only for household and restaurant use, but also for industrial purposes. In place of the strainer other heating containers or separators may be substituted, the term strainer being used in a broad sense.

Referring in detail to the drawings, 10 denotes a device embodying the invention. The same includes a pot 11 or container of any suitable size, shape, or construction, and made of any suitable material such as metal. The said pot may be generally of cylindrical form having a bottom 12, and a side wall 13 and being fully open at the top 14 to receive any desired cover (not shown) if one should be required. For this reason the opening or rim at 14 may be of a regular or other conformation according to the nature of such cover. The pot 11 is imperforate, and may have handles 15 secured thereto.

Disposed within the pot is what may be generally denominated a strainer 16, although the same has also other functions. This strainer may be made of metal, or other durable material, and while it may be of various shapes and constructions, is preferably generally similar to the pot 11. Thus the strainer has a bottom 17, side walls 18, and an open top 19. The strainer has a capacity almost as large as that of the pot, the walls thereof being preferably in close proximity to the walls of the latter. The rim of the strainer may also be in relative proximity to the rim of the pot. The lower portion of the strainer, for instance, the bottom wall and lower half of the side wall are perforated at 20.

Suitable means 21 are provided for supporting the strainer in the pot, and one form of such means may consist in the provision of a plurality of handles 22 secured to the strainer. A pair of such handles may be disposed in diametrically opposite relation, and each handle may have one or more vertical shank portions 23 secured to outside of the strainer by bolts, or rivets, or by welding. From the shank portion, the handles extend outward laterally to engage in recesses or openings 24 in the wall of the pot. Preferably the handles may be made of loop form for receiving upward extending lugs 25 which may be in the cylindrical surface of the pot and each lug being formed by a pair of spaced recesses 24.

The shank portions 23 constitute a spacing means between the walls of the strainer and pot to centrally position the former. The handles 22 may extend laterally sufficiently to afford a proper handhold for removal of the strainer and its contents from the pot.

When the strainer is removed from the pot, the contents are at the same time strained. During the cooking operation, a large efficient capacity for the device is obtained, and the contents are prevented from burning. A cover or plate may be placed on the pot, and the recesses 24 will sufficiently confine the steam and permit a slow escape thereof.

By making the upper part of the strainer imperforate, conservation of heat is obtained, since the upper part of the pot is usually less heated than the lower part thereof, and therefore the layer of water at 26 between the walls constitutes an insulating medium. But the water in the strainer and outside of the perforated parts thereof is fully free to circulate.

It will be appreciated that various changes and modifications may be made in the device as shown in the drawings, and that the same is submitted in an illustrative and not in a limiting sense, the scope of the invention being defined in the following claims.

I claim:

1. A device including a pot having recesses in the rim portion thereof, and a removable strainer in the pot having handle means secured thereto, said handle means extending laterally through said recesses to the outside of the pot for removal of the strainer from the pot.

2. A device including a pot having openings in the rim portion thereof providing an upward extending integral lug, and a strainer in the pot having a laterally extending loop handle engaging said lug for removably supporting the strainer in the pot.

3. A device including a pot having a plurality of adjacent spaced recesses in the rim portion thereof providing a plurality of upward extending lugs lying in the extended surface of the pot wall, the rest of the rim portion being otherwise of uniform character, a strainer in the pot, loop handles secured to the outside of the strainer, said handles having shanks spacing the strainer from the pot wall, said handles being outwardly laterally extending from said shanks to engage over said lug and seat in said recesses for supporting the strainer, said handles extending laterally beyond said lugs to afford a hand hold for removal of the strainer.

In testimony whereof I affix my signature.

GEROME TRUPIANO.